July 30, 1957 D. D. DEMAREST 2,800,681
APPARATUS FOR REMOVING CASINGS FROM SAUSAGES AND THE LIKE
Original Filed May 24, 1950
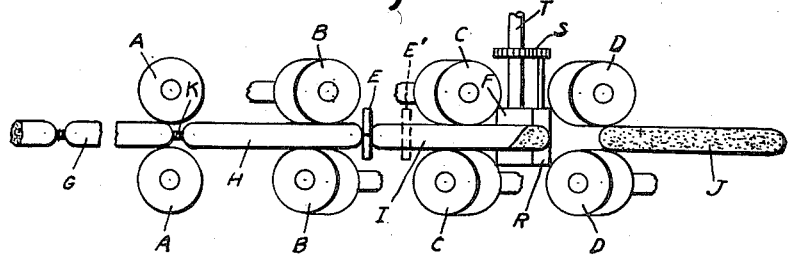
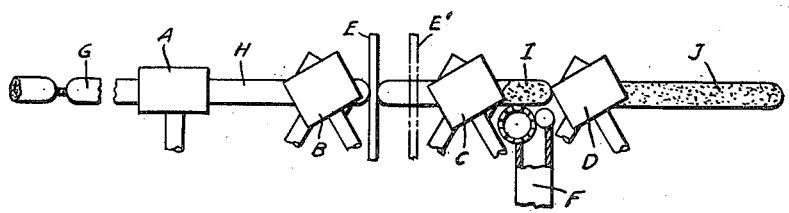
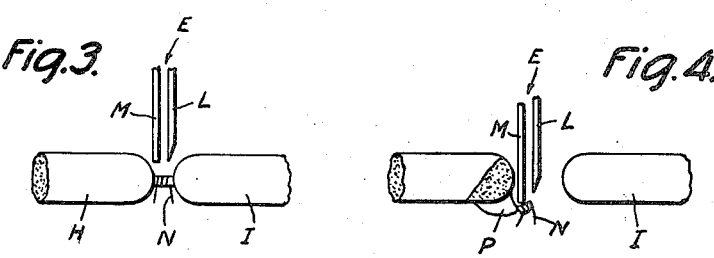
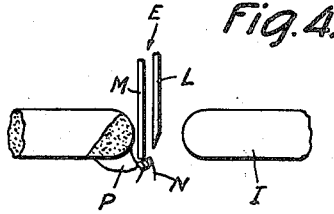
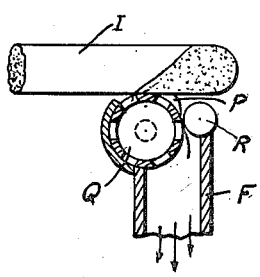
INVENTOR.
Daniel Douglas Demarest
BY *Moses, Nolte, Crews & Berry*
ATTORNEYS

United States Patent Office

2,800,681
Patented July 30, 1957

2,800,681

APPARATUS FOR REMOVING CASINGS FROM SAUSAGES AND THE LIKE

Daniel Douglas Demarest, Port Washington, N. Y., assignor to Linker Machines, Inc., Newark, N. J., a corporation of New York Continuation of application Serial No. 163,926, May 24, 1950. This application May 9, 1955, Serial No. 507,093

4 Claims. (Cl. 17—1)

The present invention relates to the art of removing casings from sausages, frankfurters and similar food products. In recent years it has become the practice of food processing companies to produce frankfurters by first filling a casing or skin of cellophane with the minced meat and other minced foods, constricting the casing at spaced intervals to form the usual links, which sections are separated by ligatures or ties, then processing the links while so encased and finally removing the casing.

Manual removal of the casing is a tedious, time-consuming, costly and unsanitary operation. Prior attempts to remove the casing by machine have not met with widespread commercial success and usually involve such operations as slitting the casing longitudinally or handling the food in such a way as to cut or mar the stuffing itself. Other objections to the machinery proposed heretofore lie in the fact that if the links are severed the links must be of a predetermined size so that the cutting operation will remain in step with the link ligatures. If the length of the link is varied, the cutting device must be manually reset to adapt itself to the new link length.

Other objections are found in the machinery used today and it is one of the objects of the present invention to successfully skin frankfurters which are linked by string.

Another object is to remove the casing from a series of linked frankfurters by suction means.

A further object is to remove skins from strings of frankfurters with mechanism which will sever the string into individual units regardless of the size of the unit.

The present application is a continuation of my co-pending application, Serial No. 163,926, filed May 24, 1950, for Apparatus for Removing Casings From Sausages and the Like, now abandoned.

Other objects and features of the invention will become apparent from the description in which:

Figure 1 is a schematic plan view of the machine;

Figure 2 is a schematic front elevation of the machine shown in Figure 1;

Figure 3 is an enlarged view similar to Figure 2, of the feeler and cutting unit;

Figure 4 is an enlarged view of the unit shown in Figure 3 after the cutting operation has been completed; and Figure 5 is an enlarged sectional view generally similar to Figure 2, showing the suction device.

This machine is adapted to peel the casing from individual links in a string of frankfurters by forming a tab at the front end of the individual frankfurter, rotating the frankfurter while it is progressing longitudinally through the apparatus, gripping the tab by a suction apparatus to remove the skin. The skin is severed from the rear end of the leading frankfurter simultaneously with the tearing of the tab at the front end of the following frankfurter.

A pair of feed rollers A on vertical axes initially grip the frankfurter which is suitably supported by means not shown and feed it to rollers B rotating about inclined axes. Since feed rollers A are revolving vertically while feed rollers B are revolving on an inclined axis, the tie or ligature between the frankfurters illustrated at K is wound slightly tighter thus affording a better tab, as will be hereinafter described, for the cutting operation. Sets of rollers C and D are similarly situated to rollers B, all rollers being connected to a source of power not shown.

As the frankfurter H is fed through rollers B, a feeler device generally shown at E, which may be of any suitable type, senses successively the divisions or ligatures between the individual frankfurters along the string and causes the actuation of the cutting knife L and the tab-forming arm M. The knife L as herein illustrated moves downwardly to sever the casing adjacent the rear end of leading frankfurter I, as shown in Figure 3, and at the same time arm M travels downwardly against the tie string N between the two frankfurters H and I, tearing the casing and by virtue of the rotational motion imparted to the frankfurter by the inclined rollers forms tab P (Fig. 4). During this operation device E has traveled with the frankfurter to the position E' shown dotted in Figs. 1 and 2.

As the forward end of the frankfurter passes over rotating suction roller Q, the tab P is picked up and held against the roller Q by suction action. Suction roller Q is rotated from shaft T which is connected to a source of power (not shown), and which also operates complementary roller R. Pipe F is connected to a vacuum chamber (not shown) and as the stripped casings on the suction roller Q strike the side of the pipe F they are removed from the roller and pass into the vacuum chamber (not shown) from where they are discharged without disturbing the suction in pipe F.

As has been hereinbefore explained, the sets of vertically inclined rollers impart a rotational as well as a longitudinal motion to the frankfurters. It is this action which causes the casing to be spirally unwound from the meat as the casing is removed by the suction roller Q.

At the next station vertically inclined rollers D continue the same feeding action as the previous sets and the skinless frankfurter J is discharged into a hopper or container (not shown).

I have described what I believe to be the best embodiments of my invention. I do not wish, however, to be confined to the embodiments shown, but what I desire to cover by Letters Patent is set forth in the appended claims.

I claim:

1. A machine for severing a sausage from a string of sausages comprising, in combination, means for feeding the string endwise toward a predetermined station, a feeler device at said station operatively related to the feeding means for sensing the ligatures between adjacent sausages as said ligatures successively reach said station, a device operatively related to said feeler device for severing the ligatures to separate the sausages, a first pair of rotating feed rollers operatively related to said severing device stationed beyond said severing device inclined to the vertical and stationed adjacent the path of the sausage travel to impart rotational as well as translational motion to the sausage, a rotating suction cylinder operatively related to said first pair of rotating feed rollers disposed substantially at right angles to the path of said sausage and beneath said sausage path for stripping the casing from said sausage, and a second pair of inclined feed rollers operatively related to said rotating suction cylinder stationed beyond said suction cylinder.

2. A machine for severing a sausage from a string of sausages comprising, in combination, means for feeding the string endwise toward a predetermined station, a feeler device at said station operatively related to the feeding means for sensing ligatures between adjacent sausages as said ligatures successively reach said station, a device operatively related to said feeler device for severing the ligatures to separate the sausages, a first pair of rotating feed rollers operatively connected to said severing device stationed beyond said severing device inclined to the vertical to impart rotational as well as translational motion to the sausage, a second pair of inclined feed rollers operatively connected to said first pair of rotating feed rollers stationed beyond said first pair of vertically inclined feed rollers and forming therewith a path for the conveyance of said sausage, a rotating suction cylinder operatively connected to said first pair of rotating feed rollers disposed between said first pair of vertically inclined feed rollers and said second pair of feed rollers for stripping the casing from said sausage, said rotating suction cylinder also being disposed beneath, adjacent, and substantially at right angles to, said path defined by said first pair of vertically inclined feed rollers and said second pair of feed rollers.

3. A machine for severing a sausage from a string of sausages and peeling it, comprising, in combination, means for feeding the string endwise toward a predetermined severing station, a feeler device at said station operatively related to the feeding means for sensing the ligatures between adjacent sausages as such ligatures successively reach such station, a device operatively related to said feeler device for severing the ligatures to separate the sausages, means operatively related to the feeler device and the severing device for tearing a skin tab in a definite angular location at the leading end of said sausage while its leading end is at said station, a short rotary suction drum operatively connected to said skin tab tearing means to engage the skin of the severed sausage and strip the skin from the sausage, a pair of rotating feed rollers operatively connected to said rotary suction drum disposed between said station and said suction drum, said rollers being oppositely inclined to each other to impart rotational as well as translational movement to the sausage, said inclined rollers constituting the sole feeding means disposed between the severing station and the suction drum, and being located near enough to the suction drum to remain in engagement with sausages of various lengths until after the leading ends have passed the suction drum, the first feeding means serving to compel the skin tab to reach said inclined rollers in a prescribed angular position, and the inclined rollers compelling the skin tab of the sausage to be turned through a prescribed angle during its advance from said rollers to the suction drum, and further similarly inclined feed rollers stationed beyond the suction drum in position to continue the rotational and translational movement of the sausage beyond the suction drum and defining with said first pair of rotating feed rollers a path for sausage travel.

4. A machine for severing a sausage from a string of sausages and peeling it as set forth in claim 3, in which the first feeding means includes a first pair of inclined feed rollers in advance of the severing station for imparting rotation to the leading end of a sausage up to the instant of tab forming and severance, and a further prescribed degree of rotation to the skin tab at the leading end of the sausage as the sausage is advanced after tab forming into engagement with the inclined rollers which follow the severing station.

References Cited in the file of this patent
UNITED STATES PATENTS

| 2,514,660 | McClure et al. | July 11, 1950 |
| 2,672,646 | Demarest et al. | Mar. 23, 1954 |